Figure 1:
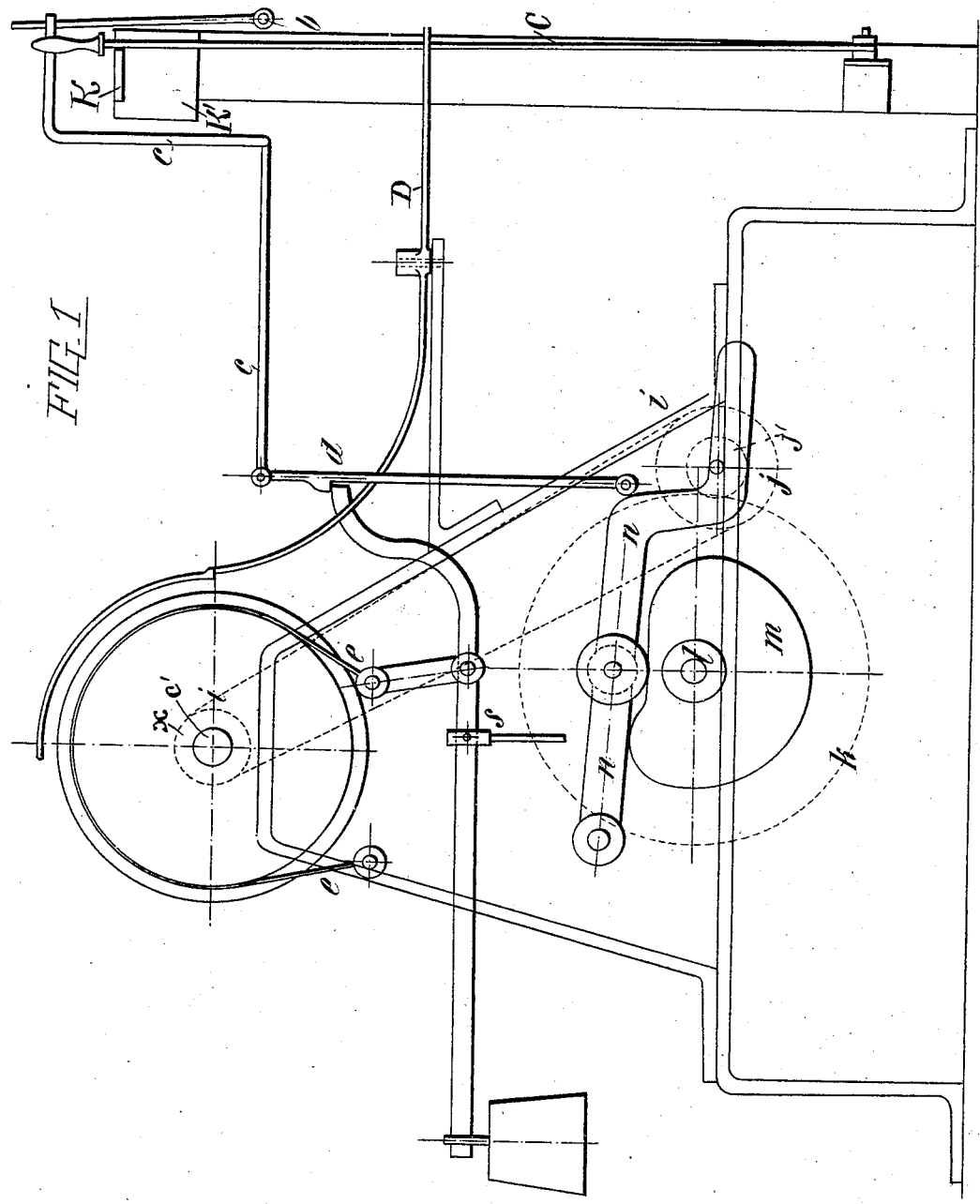

No. 787,497. PATENTED APR. 18, 1905.
O. COSSERAT.
WEFT REPLENISHING MECHANISM FOR LOOMS.
APPLICATION FILED JAN. 6, 1902.

8 SHEETS—SHEET 1.

WITNESSES:

INVENTOR

BY

ATTORNEY.

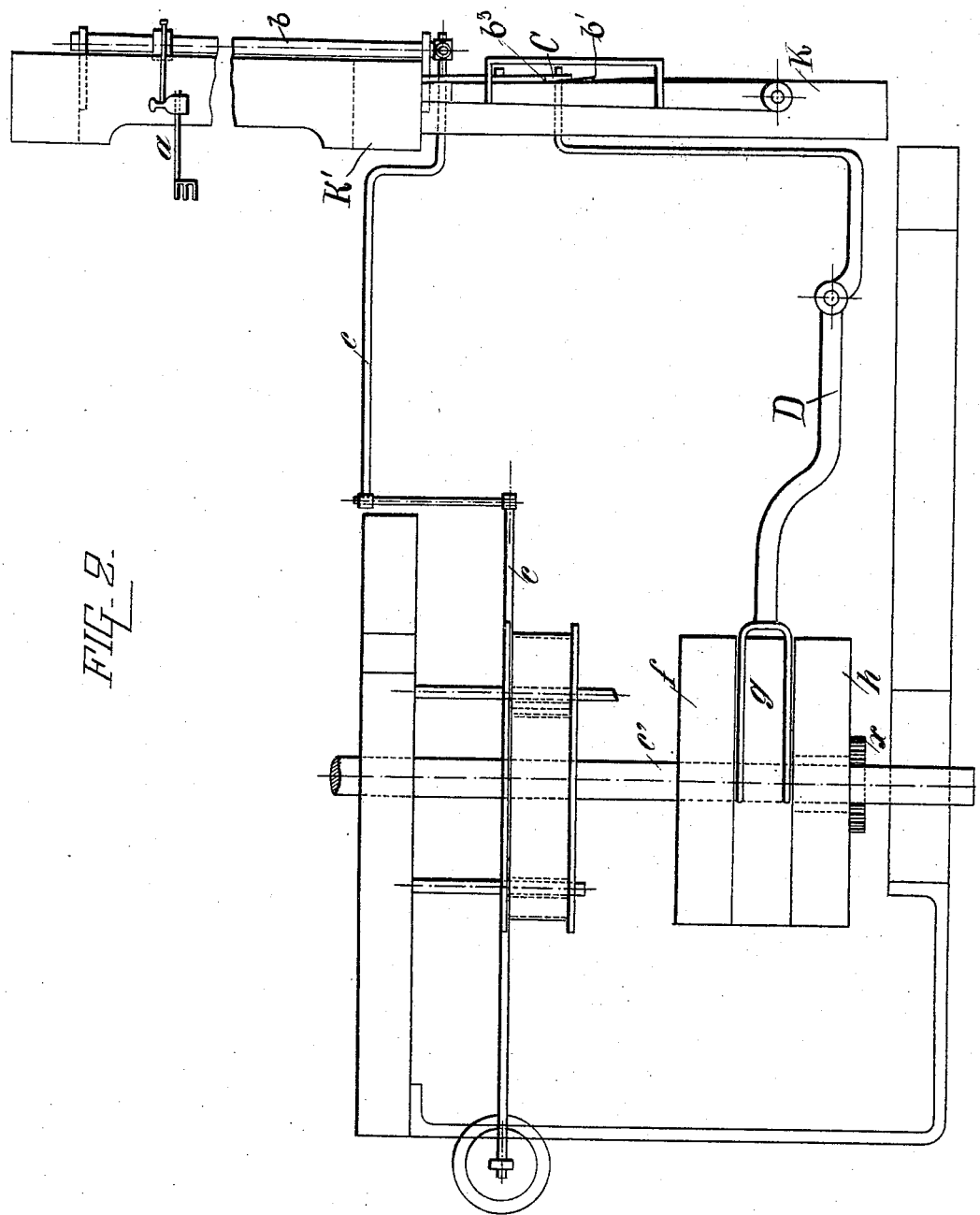

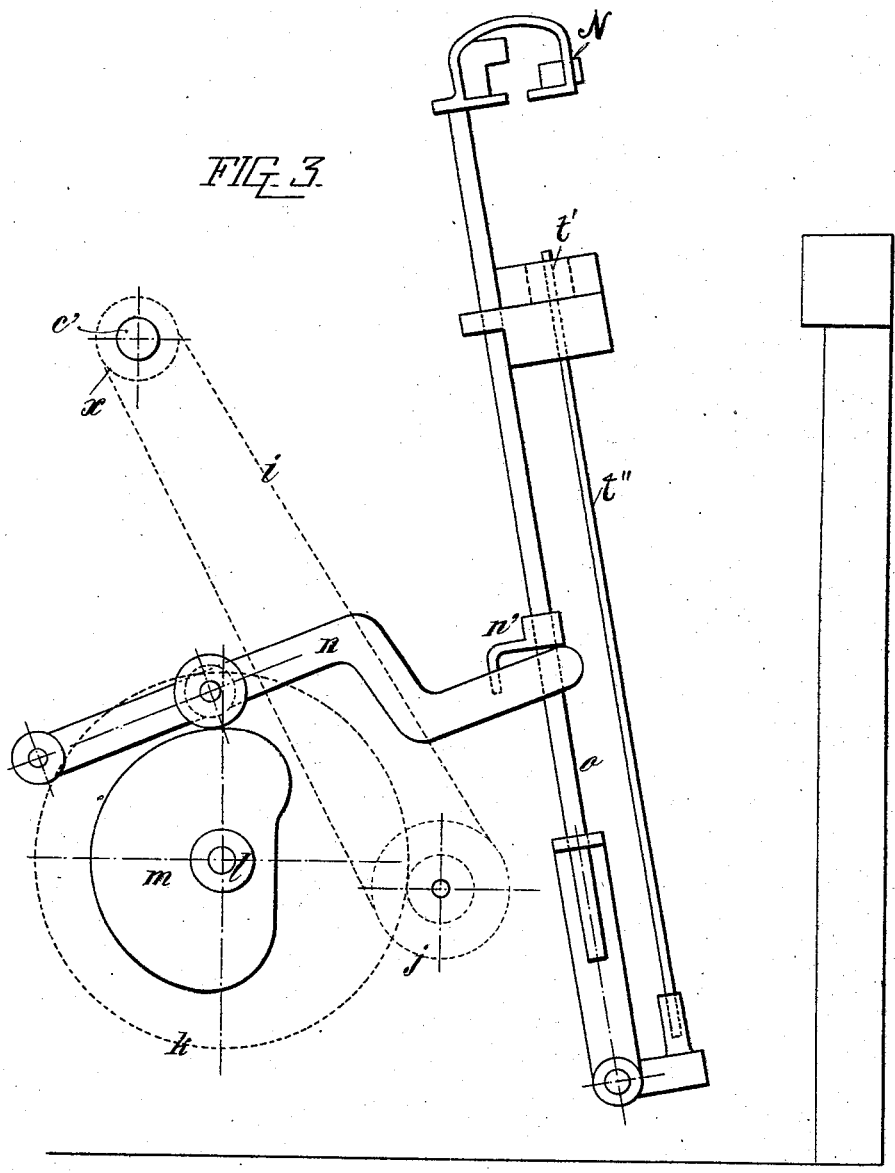

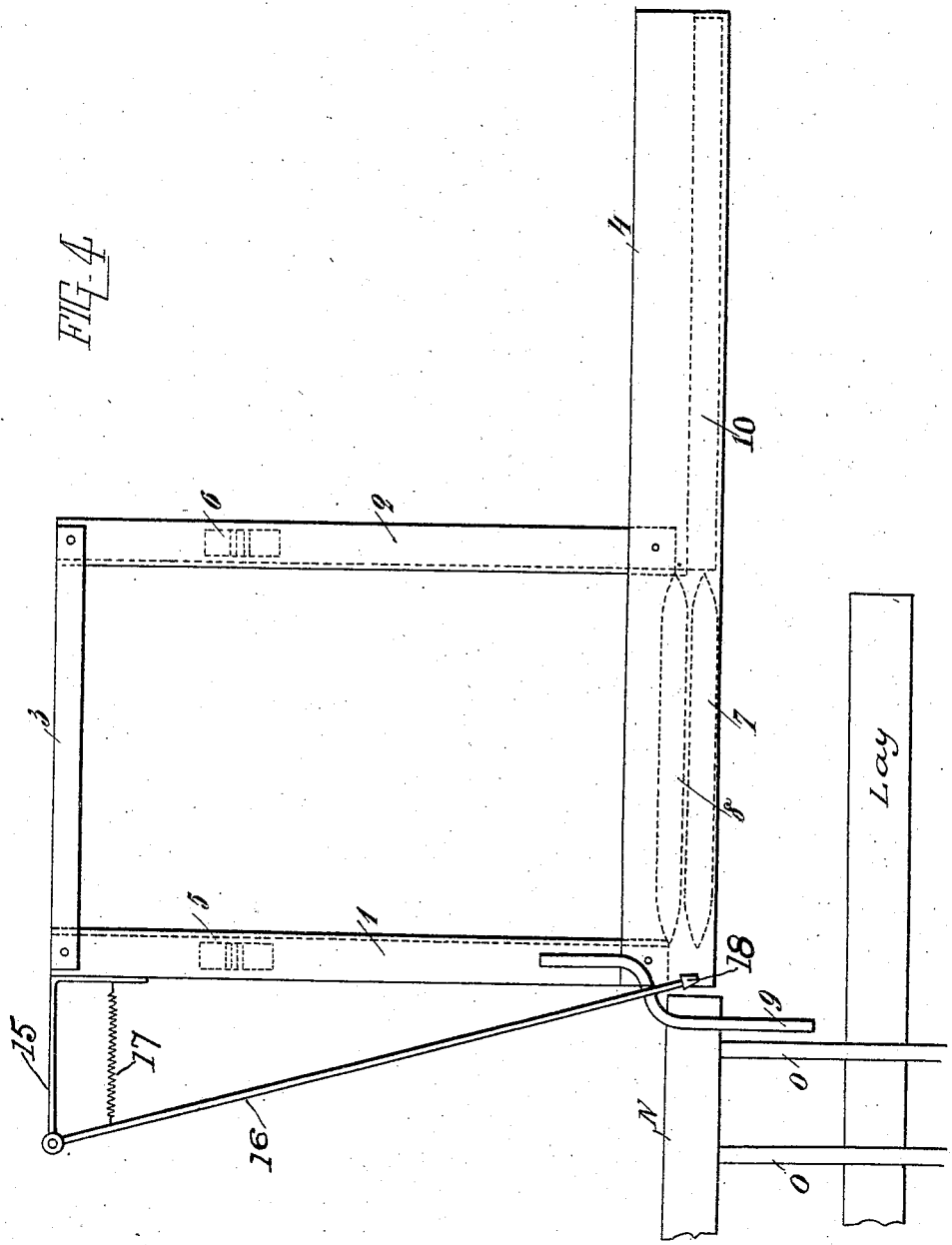

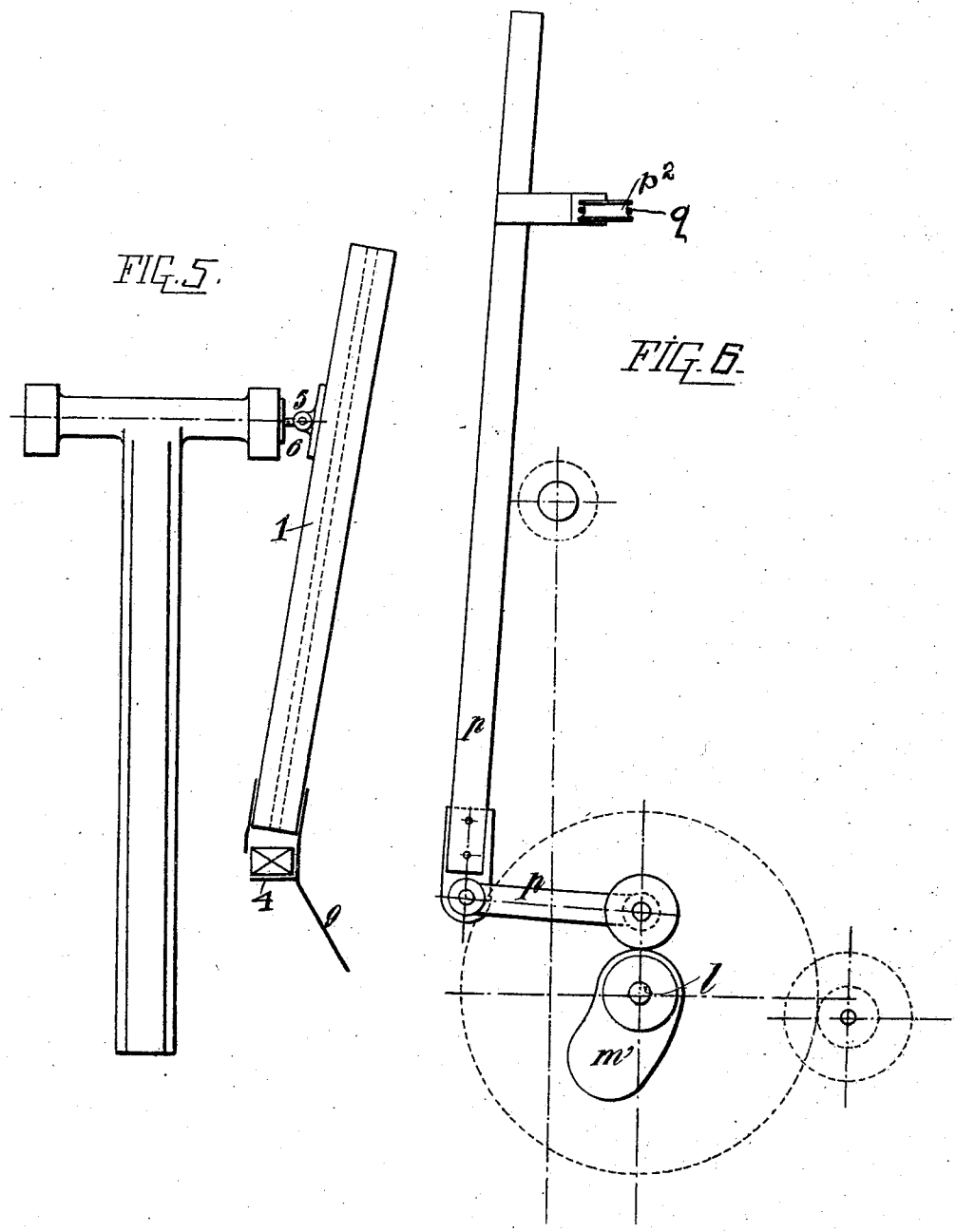

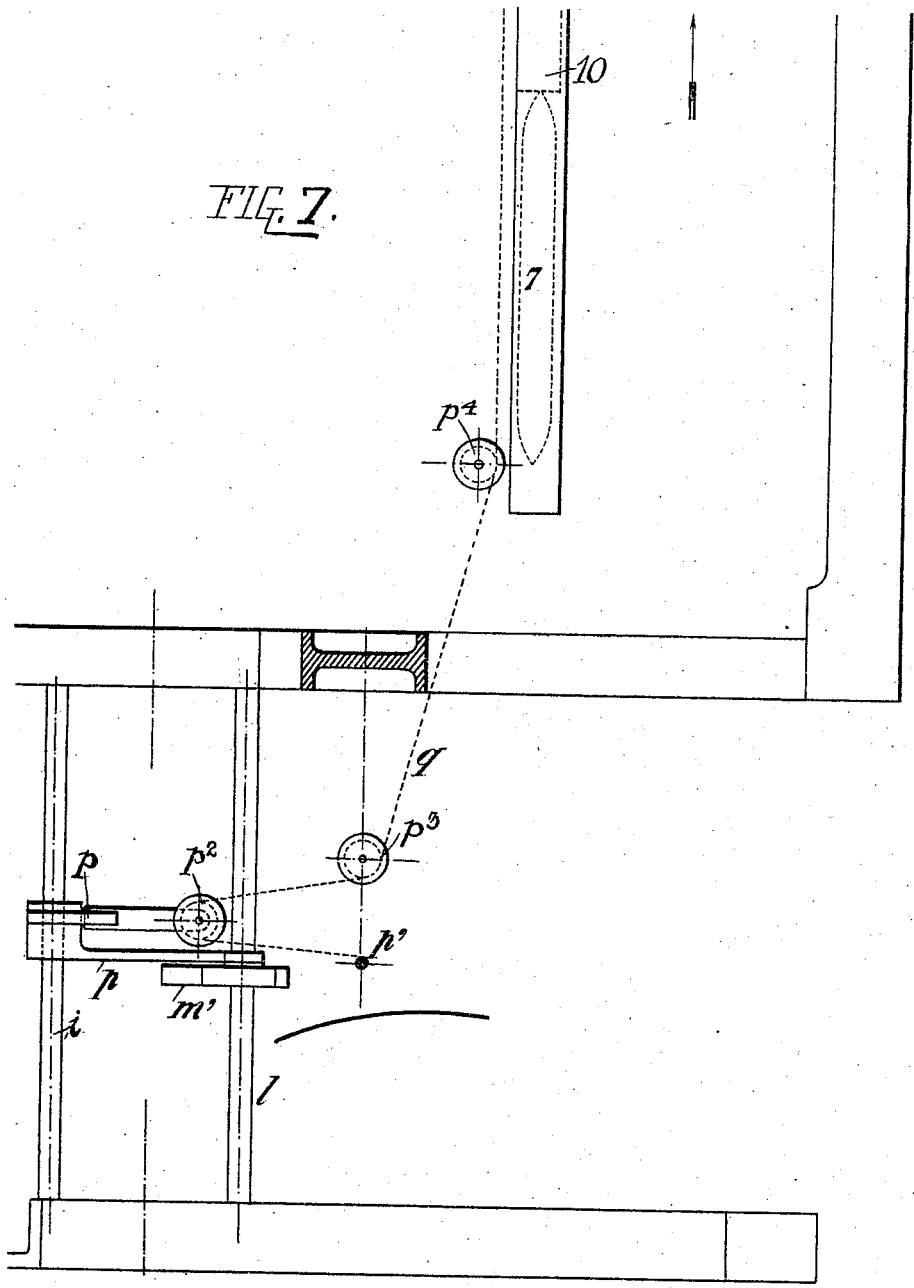

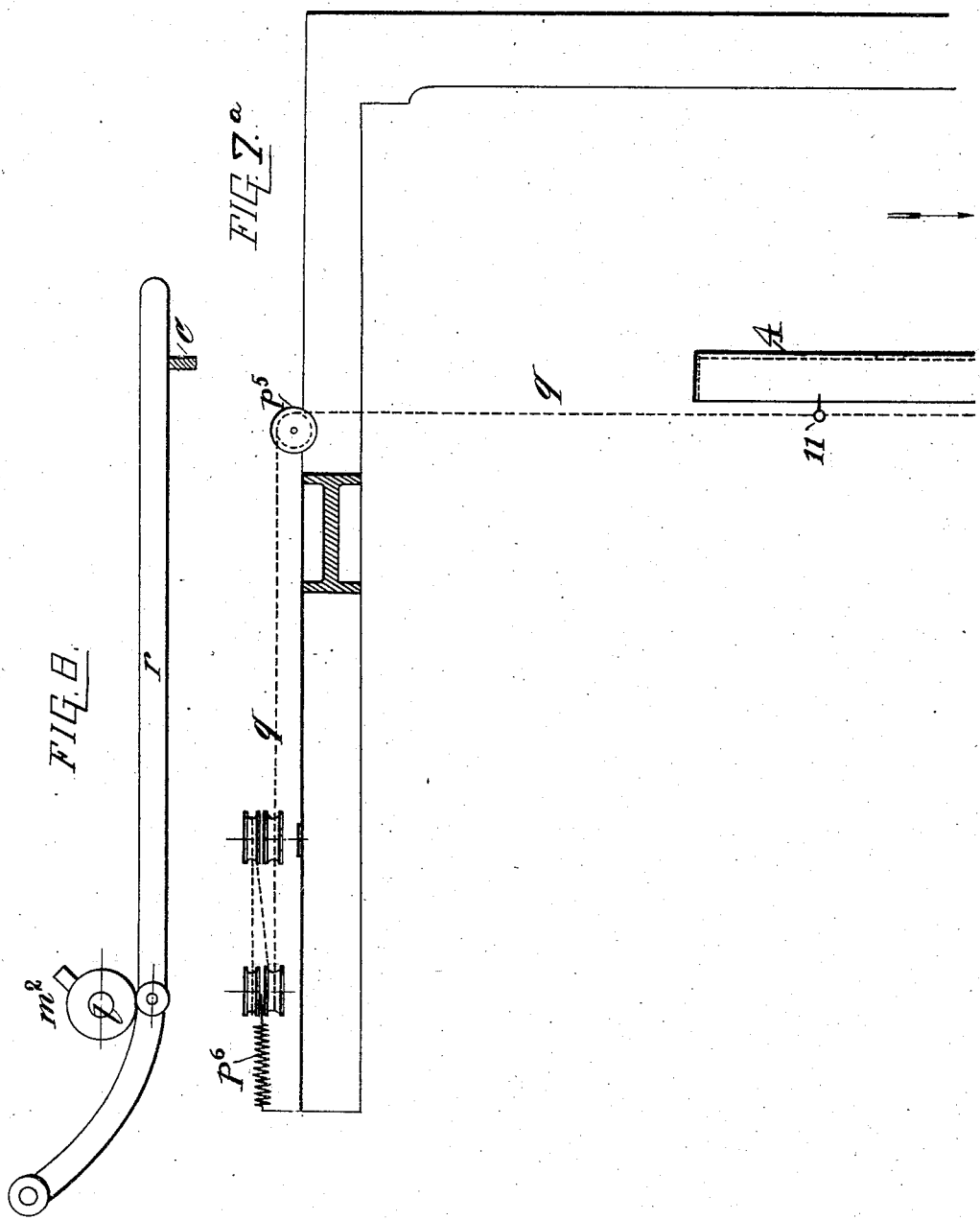

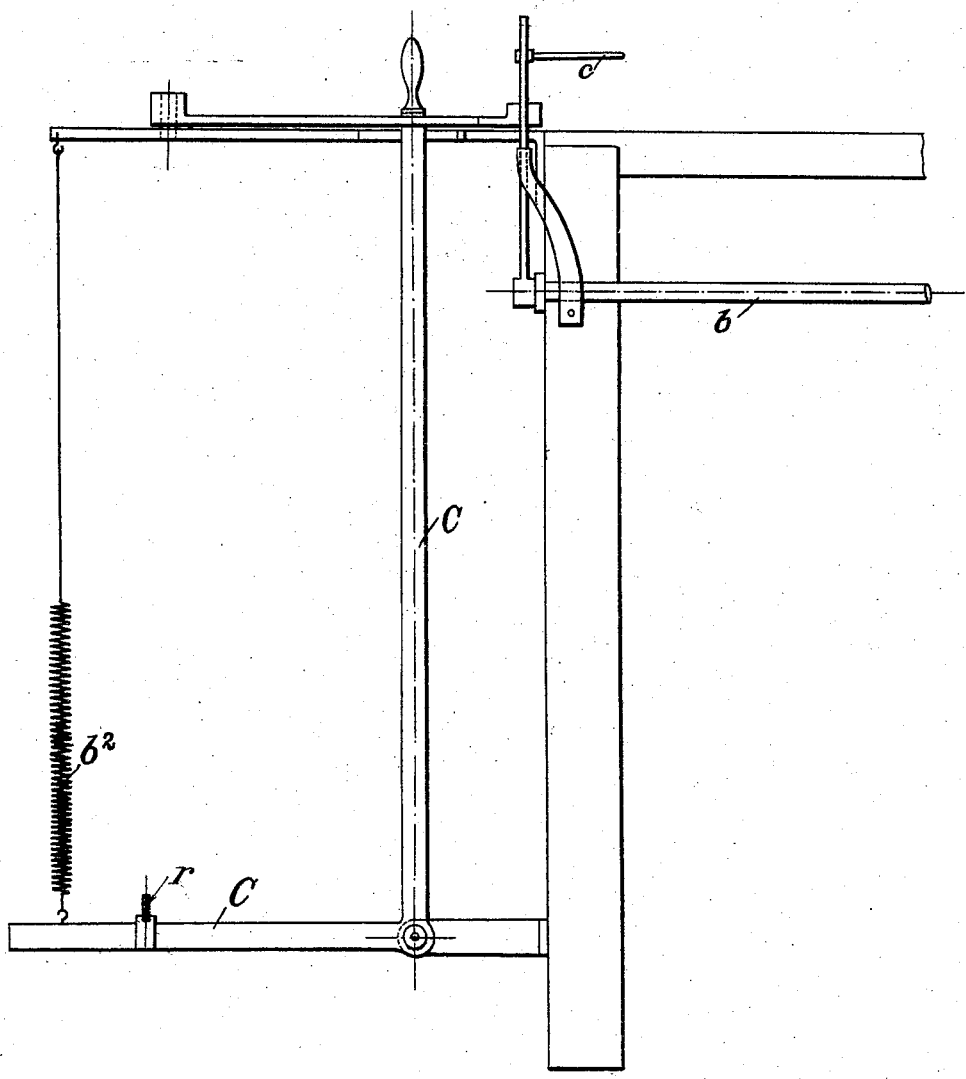

No. 787,497. Patented April 18, 1905.

UNITED STATES PATENT OFFICE.

OSCAR COSSERAT, OF AMIENS, FRANCE.

WEFT-REPLENISHING MECHANISM FOR LOOMS.

SPECIFICATION forming part of Letters Patent No. 787,497, dated April 18, 1905.

Application filed January 6, 1902. Serial No. 88,611.

*To all whom it may concern:*

Be it known that I, OSCAR COSSERAT, a citizen of the Republic of France, residing at Amiens, France, have invented certain new and useful Improvements in Weft-Replenishing Mechanism for Looms, which invention is fully set forth in the following specification.

The present invention relates to a device for changing automatically the shuttles in looms, according to which the shuttle is changed automatically by stopping the loom and bringing into operation auxiliary replenishing mechanism, the loom being automatically restarted after the exchange has been effected.

One form of carrying out this invention is represented in the accompanying drawings, in which—

Figure 1 is a partial side view showing the parts serving for changing the shuttles. Fig. 2 is a partial plan view. Fig. 3 is a side view illustrating the parts actuating the shuttle-box, the box being shown in its upper position. Fig. 4 is a side view showing in detail the magazine with the full shuttles. Fig. 5 is a side view of the magazine. Fig. 6 is a side view of the parts serving for introducing a full shuttle and removing the empty shuttle. Figs. 7 and 7ª are plan views corresponding to Fig. 6. Fig. 8 is a longitudinal view of the parts used for restarting the loom. Fig. 9 is an elevation of the same.

In the operation of the mechanism four distinct phases may be distinguished, which will hereinafter be described separately. These phases or operations are, first, stopping the loom in a determined position; second, shifting one of the shuttle-boxes of the loom; third, replacing the empty shuttle by a full one; fourth, restarting the loom.

First phase: The loom being in operation, on the breaking of the weft or on the shuttle becoming empty a weft stop-motion $a$, Fig. 2, comes into action and operates, by means of a rod $b$, placed along the breast-beam, both the disconnecting-lever C of the loom and the rods $c\ d$, Fig. 1, to release the brake $e$, acting upon the shaft $c'$, which constitutes loom-driving means. The stop-motion on actuating the disconnecting-lever C causes the same to come out of a notch $b'$, provided on an elongation K of the breast-beam K', in which notch the lever is normally held in position. When moved out of the notch, the disconnecting-lever under the influence of a suitable spring $b^2$ operates the belt-shifter D to move the belt from the fast pulley $f$, Fig. 2, over a loose pulley $g$ to a third pulley $h$, which latter is loosely mounted with regard to the loom-shaft $c'$, but is capable of actuating the mechanism which will next be described. When the disconnecting-lever is shifted into engagement with notch $b^3$ on elongation K, the belt will engage loose pulley $g$ and the loom will be entirely out of gear. The operation of shifting the belt onto the pulley $g$ may be accomplished manually by manipulating disconnecting-lever C.

Second phase: To the boss of the pulley $h$ is fixed a small pinion $x$, which by means of a chain $i$, pinions $j$ and $j''$, and gear-wheel $k$ drives a shaft $l$, carrying a cam-disk $m$. This cam on turning lifts a lever $n$, against the extremity of which bears a cross-piece $n'$, connecting two parallel bars $o$, (only one of which is shown in the drawings,) suitably guided and capable of moving under the action of the lever $n$. To the end of these parallel bars is fixed the shuttle-box N of the loom. The two bars when raised by the lever $n$ lift the box N to the height of the magazine of shuttles I, which magazine is capable of a slight oscillatory movement about an axis 5 6, secured to a suitable frame I', Fig. 4. On rising the box touches a guide 9, Fig. 4, which slightly displaces the magazine, so that the latter comes exactly in front of the box, the engagement of the shuttle-box with the magazine alone effecting the movement of the latter. By this means when the cam $m$ reaches its highest point the magazine containing the full shuttle and the shuttle-box carrying the empty shuttle are exactly at the same height and in line, so that the empty shuttle is in line with a full one. It remains only to move or push the full shuttle in order to effect the substitution in the shuttle-box of the full for the empty shuttle, as the full shuttle in the magazine and the empty shuttle in the box are in line. It would of course be very difficult to effect this substitution by direct contact of the full with the empty shuttle on account of the sharp points of the shuttles, and accordingly there is pivoted to a bracket 15, secured to the shuttle-magazine I, a lever 16, normally held in the position shown in Fig. 4 by the spring 17 and provided at its lower end with an enlargement or buffer 18. When, therefore, the full shuttle is moved it contacts with this buffer 18 and moves said lever against the tension of spring 17 until the buffer contacts with the end of and forces the empty shuttle out of the box and into a suitable receptacle, (not shown,) the full shuttle taking its place in the box. When this has taken place, the descent of the shuttle-box permits the lever 16, under the influence of the spring 17, to be returned to the position shown in Fig. 4. This movement of the full shuttle to cause it to contact with the buffer 18, which in turn contacts with the empty shuttle in the shuttle-box to effect the ejectment of the latter, is imparted thereto by an ejector arranged in the lower part of the magazine, which ejector is adapted to be forced into contact with the full shuttle at appropriate intervals to effect the desired change, as will be more fully explained hereinafter. It must be noted that the two parallel rods $o$, (only one of which is shown in Fig. 3,) carrying the box, constitute a part of the batten and oscillate together with the batten. It must be, moreover, remarked that they raise only the part of the box which incloses the shuttle, Fig. 3, while the picker $t'$, fixed to picker-stick $t''$ on the extremity of the batten, is not moved by the upward movement of the box. After the box has been raised above the picker it is open at both ends, so that shuttles are enabled to pass therethrough.

Third phase: The magazine containing the full shuttles, Fig. 4, is composed of a frame consisting of two parallel bars 1 2, of wood, connected at the top by two cross-pieces 3, (only one of which is shown in Fig. 4,) preferably of iron. At their lower ends the bars are connected by a kind of gutter 4, made of sheet-iron, and having a rectangular section to receive the shuttle. On the side opposite to the operator the gutter is provided with a longitudinal slot, and it is open at both its ends. The whole magazine is suspended in the front part of the loom from two axes 5 6, about which it is free to turn through a small angle. Supposing now that a series of shuttles placed above each other have been introduced into the frame, the lowest shuttle, which will be referred to as 7, will lie in the gutter. If now an ejector 10, which, for instance, may be introduced into the right-hand opening of the gutter, be operated to shift the shuttle 7, the latter shuttle on coming out through the left-hand opening will enter the shuttle-box, which, as above described, has been raised to the height of the magazine. When the ejector is drawn back, the place occupied previously by the ejected shuttle 7 is made free, so the next shuttle 8 takes the place of the ejected shuttle 7.

The third phase thus consists in the movement of the ejector pushing out the shuttle 7. This movement is effected in the following manner: On the shaft $l$, carrying the cam-disk $m$, there is mounted another cam $m'$, Figs. 6 and 7, which actuates a bell-crank lever $p$, connected to a belt, cord, or chain $q$, which passes over a series of grooved guide-pulleys $p^2$ $p^3$ $p^4$ $p^5$, and is secured at one end to a fixed piece $p'$ and at its other end to a spring or weight $p^6$, exerting a strong tension on the chain. The chain passes for a part of its length along the magazine on the level of the shuttle 7 and the ejector 10. The ejector may be made simply of a piece of wood having a section corresponding to that of the gutter, and it is connected to the chain by means of two pins or eyebolts 11. (Only one shown in Fig. 7 and the other in Fig. 7$^a$.) On the rotation of the shaft $l$ the cam $m'$ causes, by means of the lever $p$, the chain to move along the magazine, whereby the ejector is also operated, so as to push the shuttle 7 to take up the place occupied by the empty shuttle. The cam $m'$ continues its rotation and the ejector is brought back into its initial position by the action of the spring or weight actuating the chain, and the fresh shuttle 8 takes the place previously occupied by the empty shuttle 7. After a new shuttle has thus been introduced into the shuttle-box on the continuation of the rotation of the first-named cam $m$ the lever $n$, Fig. 1, descends, so as to permit of the downward movement of the box into its initial position. The loom is now supplied with a fresh shuttle and may be restarted.

Fourth phase: For restarting the loom a third cam-disk $m^2$, Figs. 8 and 9, is provided on the shaft $l$, which cam actuates a lever $r$, bearing against the end of the brake-lever C. By this mechanism the lever C is reset to its initial position, in which it rests in the notch $b'$. Before or during the upward movements of the box the first cam-lever $n$, by means of a suspended rod or finger $s$, Fig. 1, releases the brake, so as to enable the loom to be restarted. As soon as the cam $m^2$ has, through lever $r$, replaced the disconnecting-lever C in its initial position the belt is brought from the loose pulley $h$ to the fast pulley $f$, whereby the loom is restarted without the intervention of the operator. As the belt when passing from the loose pulley $h$, Fig. 2, to the fast pulley $f$ passes over the intermediate loose pulley $g$ a dead-point occurs, and it would seem as if the machine would therefore stop. However, as the movement of the belt onto the loose pulley coincides with the descent of the shuttle-box, this movement is continued by the momentum of the box acting upon the lever $n$, so that the dead-point is overcome and the loom is restarted, being now supplied with a fresh shuttle. It is obvious that in this manner the four phases may be repeated any number of times, the operator needing only to supply the magazine with fresh shuttles and to repair the broken warp-threads.

The invention herein disclosed and claimed is susceptible of embodiments other than that herein illustrated and described in detail. In a companion application, filed May 2, 1902, Serial No. 105,638, the invention is embodied together with other improvements in weft-replenishing mechanism, wherein the spools in the shuttle are changed instead of the shuttle itself being changed.

What is claimed is—

1. In a loom, a shaft for actuating the same, a fast pulley on the shaft by which it is driven, two loose pulleys on said shaft one for receiving the belt when the loom-operating and weft-replenishing mechanism are both out of operation and the other for receiving the belt to operate the weft-replenishing mechanism independent of the loom-actuating mechanism, a belt-shifter for moving the belt to any one of the pulleys, weft-replenishing mechanism, driving connections continuously gearing one of the loose pulleys to said mechanism and belt-shifter-actuating means operating to move the belt onto the loose pulley which starts operating the weft-replenishing mechanism upon breaking or exhaustion of the thread.

2. In a loom, a brake for automatically stopping the loom-operating mechanism upon breaking or exhaustion of the weft-thread, a shuttle box or holder, shuttle-box-shifting means automatically moving said box from its normal position to a position to receive replenishment of the weft, said means operating at the same time to release the brake after the latter has arrested the loom-operating mechanism.

3. In weft-replenishing mechanism for looms, a shuttle box or holder, shuttle-box-shifting means automatically moving said box from its normal position to a position for receiving a replenishment of the weft and for returning it to its normal position, weft-replenishing means operating to automatically insert a fresh supply of weft in the shuttle-box while the latter is in its shifted position, means for automatically throwing the shuttle-box-shifting means and the weft-replenishing means into operation upon breaking or exhaustion of the weft-thread and out of operation upon the return of the shuttle-box to its normal position.

4. In weft-replenishing mechanism for looms, a shuttle box or holder, shuttle-box-shifting means automatically moving said box from its normal position to a position for receiving a replenishment of the weft and for returning it to its normal position, weft-replenishing means operating to automatically insert a fresh supply of weft in the shuttle-box while the latter is in its shifted position, loom-driving means, and means for automatically throwing the loom-driving means out of operation and the shuttle-box-shifting means and the weft-replenishing means into operation upon breaking or exhaustion of the weft-thread, and vice versa upon return of the shuttle-box to its normal position.

5. In weft-replenishing mechanism for looms, a shuttle box or holder, shuttle-box-shifting means automatically moving said box from its normal position to a position for receiving a fresh supply of weft and for returning it to its normal position, loom-driving means, a brake therefor, means for automatically throwing the loom-driving means out of operation and the shuttle-box-shifting means into operation and applying the brake upon breaking or exhaustion of the weft-thread, and means automatically throwing the shuttle-box-shifting means out of operation and the loom-driving means into operation upon return of the shuttle-box to its normal position.

6. In a loom, a shaft for actuating the loom-operating mechanism, a fast pulley on the shaft, a loose pulley on said shaft, a belt-shifter for moving the belt to said loose pulley, driving connections continuously gearing the loose pulley to the shuttle-changing mechanism, belt-shifter-actuating means automatically operating the belt-shifter to move the belt onto said loose pulley, and shuttle-changing mechanism set in operation through said loose pulley upon breaking or exhaustion of the thread.

7. In shuttle-changing mechanism for looms, a brake automatically applied to stop the loom-operating mechanism upon breaking or exhaustion of the weft-thread, a shuttle box or holder, shuttle-box-shifting means automatically moving said box from its normal position to a position to receive a fresh shuttle said means operating at the same time to release the brake after the latter has arrested the loom-operating mechanism.

8. In shuttle-changing mechanism for looms, a shuttle box or holder, shuttle-box-shifting means automatically moving said box from its normal position to a position for receiving a fresh shuttle and for returning it to its normal position, shuttle-replenishing means operating to automatically insert a fresh shuttle in the shuttle-box while the lattter is in its shifted position, loom-driving means, and means for automatically throwing the loom-driving means out of operation and the shuttle-box-shifting means and the shuttle-replenishing means into operation upon breaking or exhaustion of the shuttle-thread and vice versa upon the return of the shuttle-box to its normal position.

9. In shuttle-changing mechanism for looms, a magazine for full shuttles, a shuttle box or holder, shuttle-box-shifting means automatically moving said box from its normal position to a position for receiving a fresh shuttle and for returning it to its normal position, loom-driving means, a brake therefor, means for automatically throwing the loom-driving means out of operation the shuttle-box-shifting means into operation and applying the brake upon breaking or exhaustion of the shuttle-thread, and means automatically throwing the shuttle-box-shifting mechanism out of operation and the loom-driving means into operation upon return of the shuttle-box to its normal position.

10. In weft-replenishing mechanism for looms, a pivotally-suspended magazine for weft independent of the remainder of the mechanism, and movable at one end to proper position for the delivery of weft therefrom, and a shuttle-box adapted to engage said magazine to move it to the weft-delivering position and constituting the sole means for effecting said movement.

11. In weft-replenishing mechanism for looms, a pivotally-suspended magazine for weft movable at its lower end to proper position for delivery of weft therefrom, an ejector carried by and movable with the magazine for delivery of weft therefrom by a longitudinal movement, and automatically-operating ejector-actuating means.

12. In weft-replenishing mechanism, the combination of an oscillatory magazine for weft having a delivery-opening at its lower end, an ejector carried by and movable with the magazine and adapted to deliver the weft through said opening by a longitudinal movement, and automatically-operating ejector-actuating means.

13. In weft-replenishing mechanism, the combination of an oscillatory magazine for containing a pile of weft-carrying elements, an elongated gutter at the bottom of the magazine having a delivery-opening at one end, an ejector carried by and movable with the gutter and which when quiescent is located in the opposite end of the gutter the lowermost weft-carrying element of the pile being interposed between the ejector and delivery-opening, and automatic ejector-operating means.

14. In weft-replenishing mechanism, the combination of an oscillatory magazine for weft-carrying elements, an ejector carried by and movable with the magazine for delivering the weft-carrying elements therefrom and automatic ejector-operating mechanism for operating the ejector in any position of the magazine.

15. In weft-replenishing mechanism, the combination of an oscillatory magazine for weft-carrying elements, an ejector carried by and movable with the magazine for delivering the weft-carrying elements therefrom by a longitudinal movement, automatic ejector-operating mechanism, and flexible connection with the ejector to permit the oscillatory movements of the magazine.

16. In weft-replenishing mechanism, the combination of an oscillatory magazine for weft-carrying elements, an ejector movable with and working in the magazine for delivering the weft-carrying elements therefrom, and automatic ejector-operating mechanism comprising a flexible cord or the like, a spring to which one end of said cord is connected, an ejector connected at an intermediate part of said cord, and means connected to the other end of the cord for pulling on the same to move the ejector.

17. In weft-replenishing mechanism for looms, a pivotally-suspended magazine for full shuttles, a guide mounted thereon, a shuttle-box and means for elevating the same to receive a supply of weft, said guide engaging the shuttle-box to exactly aline the lowermost full shuttle therein with the empty shuttle in the shuttle-box, and means imparting a longitudinal movement to the full shuttle, whereby it effects the ejectment of and replaces the empty shuttle.

18. In a device of the kind described, a magazine containing full shuttles, means for replacing an empty shuttle by a full one, comprising a gutter for receiving the lowest of a series of full shuttles, a driver adapted to push out said full shuttle, so as to simultaneously remove the empty shuttle from the box and to take its place, a cam and transmission gear for actuating the driver and means for elevating the box with the empty shuttle to a position for receiving the full shuttle and lowering the box with the full shuttle, substantially as described.

In testimony whereof I have signed my name to this specification in the presence of two subscribing witnesses.

OSCAR COSSERAT.

Witnesses:
J. ALLISON BOWEN,
EDWARD P. MACLEAN.